US010562992B2

(12) United States Patent
Yoon et al.

(10) Patent No.: US 10,562,992 B2
(45) Date of Patent: Feb. 18, 2020

(54) PREPARATION METHOD OF POROUS SUPER ABSORBENT POLYMER (71) Applicant: LG Chem, Ltd., Seoul (KR)

(72) Inventors: Ki Youl Yoon, Daejeon (KR); Hyo Sook Joo, Daejeon (KR); Gi Cheul Kim, Daejeon (KR); Hyeon Choi, Daejeon (KR); Ju Eun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/090,722

(22) PCT Filed: Dec. 13, 2017

(86) PCT No.: PCT/KR2017/014642
§ 371 (c)(1),
(2) Date: Oct. 2, 2018

(87) PCT Pub. No.: WO2018/124550
PCT Pub. Date: Jul. 5, 2018

(65) Prior Publication Data
US 2019/0085104 A1 Mar. 21, 2019

(30) Foreign Application Priority Data
Dec. 26, 2016 (KR) .................. 10-2016-0179492

(51) Int. Cl.
*C08F 20/18* (2006.01)
*C08F 20/06* (2006.01)
*C08F 20/56* (2006.01)
*C08F 2/44* (2006.01)
*C08F 2/38* (2006.01)
*C08K 5/103* (2006.01)
*C08J 3/24* (2006.01)
*C08J 3/12* (2006.01)
*C08J 9/28* (2006.01)
*C08L 71/02* (2006.01)
*B01J 20/26* (2006.01)
*C08F 20/08* (2006.01)
*C08K 3/36* (2006.01)
*C08K 3/22* (2006.01)

(52) U.S. Cl.
CPC ............ *C08F 20/18* (2013.01); *B01J 20/267* (2013.01); *C08F 2/38* (2013.01); *C08F 2/44* (2013.01); *C08F 20/06* (2013.01); *C08F 20/08* (2013.01); *C08F 20/56* (2013.01); *C08J 3/12* (2013.01); *C08J 3/245* (2013.01); *C08J 9/28* (2013.01); *C08K 5/103* (2013.01); *C08L 71/02* (2013.01); *B01J 2220/68* (2013.01); *C08J 2205/022* (2013.01); *C08K 3/22* (2013.01); *C08K 3/36* (2013.01); *C08K 2003/2227* (2013.01)

(58) Field of Classification Search
CPC .... C08F 20/18; C08F 2/38; C08F 2/44; C08F 20/06; C08F 20/08; C08F 20/56; C08F 2220/68; B01J 20/267; C08J 3/12; C08J 3/245; C08J 9/28; C08J 2205/022; C08K 5/103; C08K 3/22; C08K 3/36; C08K 2003/2227; C08L 71/02
USPC ........................................................ 502/402
See application file for complete search history.

(56) References Cited

U.S. PATENT DOCUMENTS

| 5,338,766 A | 8/1994 | Phan et al. |
| 2001/0038831 A1 | 11/2001 | Park et al. |
| 2004/0110913 A1 | 6/2004 | Kanto et al. |
| 2004/0224021 A1 | 11/2004 | Omidian et al. |
| 2013/0310250 A1 | 11/2013 | Belack |
| 2017/0073478 A1 | 3/2017 | Joo et al. |
| 2017/0273836 A1 | 9/2017 | Kim et al. |
| 2018/0185820 A1 | 7/2018 | Tada et al. |

FOREIGN PATENT DOCUMENTS

| EP | 0417761 A2 | 3/1991 |
| EP | 0690729 A1 | 1/1996 |
| EP | 0692514 A1 | 1/1996 |
| EP | 0697217 A1 | 2/1996 |
| JP | 101178509 A | 7/1989 |
| JP | H07145208 A | 6/1995 |
| JP | H08508527 A | 9/1996 |
| JP | H09503954 A | 4/1997 |
| JP | 2006169385 A | 6/2006 |
| JP | 2009280668 A | 12/2009 |
| JP | 2015500351 A | 1/2015 |

(Continued)

OTHER PUBLICATIONS

Extended European Search Report including the Written Opinion for Application No. EP 17888065.4 dated Apr. 10, 2019.

(Continued)

*Primary Examiner* — Edward M Johnson
(74) *Attorney, Agent, or Firm* — Lerner, David, Littenberg, Krumholz & Mentlik, LLP (57) ABSTRACT The present disclosure relates to a preparation method of a porous super absorbent polymer including the steps of preparing a monomer neutralized solution by adding an internal cross-linking agent, an initiator, an inorganic filler, and a nonionic surfactant to a neutralized solution obtained by neutralizing at least 80 mol % of a water soluble ethylene-based unsaturated monomer containing acidic groups; high-shear mixing the monomer neutralized solution; preparing a hydrogel polymer from the high-shear mixed monomer neutralized solution by thermal polymerization or photopolymerization; and preparing a base resin powder by drying, pulverizing, and classifying the hydrogel polymer.

12 Claims, 3 Drawing Sheets

(56) References Cited

FOREIGN PATENT DOCUMENTS

| | | |
|---|---|---|
| JP | 2015199958 A | 11/2015 |
| JP | 2016016667 A | 2/2016 |
| KR | 20030078925 A | 10/2003 |
| KR | 20050022813 A | 3/2005 |
| KR | 20160016713 A | 2/2016 |
| KR | 20160016714 A | 2/2016 |
| KR | 20160144908 A | 12/2016 |
| WO | 2016158975 A1 | 10/2016 |

OTHER PUBLICATIONS

Chatterjee, Pronoy, "Absorbency", Textile Science and Technology 7, 1985, pp. 42-43.
International Search Report for PCT/KR2017/014642, dated Apr. 9, 2018.
Odian, George, "Principles of Polymerization", John Wiley & Sons, Inc., 1981, p. 203.
Richardson, et al., "Flow of Fluids Through Granular Beds and Packed Columns", Chemical Engineering, vol. 2, 1978, pp. 125-127.
Schwalm, Reinhold, "UV Coatings: Basics, Recent Developments and New Applications", Elsevier, Dec. 2006, p. 115.

PREPARATION METHOD OF POROUS SUPER ABSORBENT POLYMER

CROSS-REFERENCE TO RELATED APPLICATIONS

This application is a national phase entry under 35 U.S.C. § 371 of International Application No. PCT/KR2017/014642, filed Dec. 13, 2017, which claims priority to Korean Patent Application No. 10-2016-0179492, filed Dec. 26, 2016, the disclosures of which are incorporated herein by reference.

TECHNICAL FIELD

The present disclosure relates to a preparation method capable of providing a porous super absorbent polymer which can swell at a high rate upon contact with water and has mechanical properties such as high gel strength in a swollen state while exhibiting excellent physical properties such that water retention capacity (CRC) and absorption ability under pressure (AUP) are improved together.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In most cases, the super absorbent polymer is widely used in the field of hygiene products such as diapers and sanitary napkins, and, for this purpose, it is necessary to exhibit a high absorption capacity for moisture and the like. In addition, it is necessary that the absorbed moisture should not leak out even under external pressure. Further, it needs to show excellent permeability by maintaining its shape even in an expanded (swelled) state after absorbing water.

However, it has been known that it is difficult to improve both the water retention capacity (CRC) indicating basic absorption capacity and water retention ability of the super absorbent polymer, and the absorption ability under pressure (AUP) indicating the characteristic of holding the absorbed moisture even under external pressure together. This is because, when the overall cross-link density of the super absorbent polymer is controlled to be low, the CRC may relatively increase, but the AUP may decrease because the cross-linked structure becomes loose and the gel strength is reduced. On the other hand, when the cross-linking density is controlled to be high for improving the AUP, the basic CRC may decrease because moisture is hardly absorbed through the dense cross-linked structure.

For this reason, there has been a limit to provide a super absorbent polymer improved in both water retention capacity and the absorption ability under pressure. In order to solve this problem, there have been various attempts to improve these properties by controlling the type or amount of the internal cross-linking agent or the surface cross-linking agent. However, such attempts have reached the limited.

Therefore, there is a continuing need to develop a super absorbent polymer exhibiting improved water retention capacity and absorption ability under pressure together, and a technology capable of producing the same.

DETAILED DESCRIPTION OF THE INVENTION

Technical Problem

Accordingly, the present disclosure is to provide a preparation method capable of providing a porous super absorbent polymer which can swell at a high rate upon contact with water and has mechanical properties such as high gel strength in a swollen state while exhibiting excellent physical properties such that water retention capacity (CRC) and absorption ability under pressure (AUP) are improved together.

Technical Solution

The present disclosure provides a preparation method of a porous super absorbent polymer, including the steps of: preparing a monomer neutralized solution by adding an internal cross-linking agent, an initiator, an inorganic filler, and a nonionic surfactant to a neutralized solution obtained by neutralizing at least 80 mol % of a water soluble ethylene-based unsaturated monomer containing acidic groups; high-shear mixing the monomer neutralized solution; preparing a hydrogel polymer from the high-shear mixed monomer neutralized solution by thermal polymerization or photopolymerization; and preparing a base resin powder by drying, pulverizing, and classifying the hydrogel polymer.

Hereinafter, the preparation method of a porous super absorbent polymer to the exemplary embodiments of the present disclosure will be described in more detail. However, the following is only for better understanding of the present invention, and the scope of the present invention is not limited thereby, and it is obvious to a person skilled in the related art that the embodiments can be variously modified within the scope of the present invention.

The term "include" or "have" means to include any elements (or components) without particular limitation unless there is a particular mention about them in this description, and it cannot be interpreted as having a meaning of excluding addition of other elements (or components).

In this disclosure, (meth) acrylate is meant to include both acrylate and methacrylate.

One embodiment of the present disclosure provides a preparation method of a porous super absorbent polymer, including the steps of: preparing a monomer neutralized solution by adding an internal cross-linking agent, an initiator, an inorganic filler, and a nonionic surfactant to a neutralized solution obtained by neutralizing at least 80 mol % of a water soluble ethylene-based unsaturated monomer containing acidic groups; high-shear mixing the monomer neutralized solution; preparing a hydrogel polymer from the high-shear mixed monomer neutralized solution by thermal polymerization or photopolymerization; and preparing a base resin powder by drying, The present inventors have confirmed by experiments that the porous super absorbent polymer having a specific internal structure and thus a porous structure can be prepared by adding an internal cross-linking agent, and a nonionic surfactant to a neutralized solution obtained by neutralizing at least 80 mol % of a water soluble ethylene-based unsaturated monomer containing acidic groups, and then high-shear mixing, followed by the polymerization. And they have completed this invention.

The porous super absorbent polymer prepared as described above can swell at a high rate upon contact with water and has excellent physical properties such that water retention capacity (CRC) and absorption ability under pressure (AUP) are improved together in a swollen state.

Specifically, the prepared porous super absorbent polymer includes a first cross-linked polymer in which the water soluble ethylene-based unsaturated monomer is cross-linked and polymerized. In this first cross-linked polymer, a large number of fine pores are formed, and these fine pores are connected to each other to form a capillary channel. Accordingly, it is possible to swell at relatively high rate as compared with the previously known super absorbent polymers. In addition, due to the cross-linked polymerization structure of the first cross-linked polymer and the distribution of the fine pores, the porous super absorbent polymer can obtain mechanical properties such as high gel strength in a swollen state, and can exhibit high cross-link density and relatively high gel strength, thereby exhibiting excellent absorption ability under pressure. As a result, not only doesn't the absorbed water leak out under the external pressure, but also maintains its shape in an expanded (swelled) state after absorbing water, thereby exhibiting excellent permeability.

More specifically, the porous super absorbent polymer may include the first cross-linked polymer in which the water soluble ethylene-based unsaturated monomer is cross-linked polymerized, and the first cross-linked polymer may have fine pores having a thickness of 1 μm to 2,000 μm, 10 μm to 2,000 μm, or 50 μm to 500 μm.

Meanwhile, as at least 80 mol % or more, 80 mol % to 98 mol %, or 85 mol % to 95 mol % of the water soluble ethylene-based unsaturated monomer containing acidic groups is neutralized, the nonionic surfactant can be more uniformly dispersed. Thus, before or during the formation of the hydrogel polymer, the nonionic surfactant can be uniformly distributed throughout the hydrogel polymer, and the size and shape of the pores can be appropriately maintained in the polymerization process at high temperature. Accordingly, the fine pores can be uniformly distributed over the entire area of the finally prepared porous super absorbent polymer.

Therefore, the preparation method of the porous super absorbent polymer may further include a step of adding a basic compound to the water soluble ethylene-based unsaturated monomer containing acidic groups to form a neutralized solution which is at least 80 mol % neutralized.

The neutralization degree of the water soluble ethylene-based unsaturated monomer containing acidic groups can be calculated and confirmed from a molar ratio of the acidic groups of the water soluble ethylene-based unsaturated monomer containing acidic groups to the hydroxyl groups of the basic compound.

Examples of the basic compound used for the neutralization are not particularly limited, but sodium hydroxide, potassium hydroxide, calcium hydroxide and the like can be used in consideration of the stability of the neutralized solution.

Meanwhile, in the step of high-shear mixing the monomer neutralized solution, a high shear force is applied to the monomer neutralized solution containing a water soluble ethylene-based unsaturated monomer containing acidic groups and neutralized by 80 mol % or more, an internal cross-linking agent, an initiator, an inorganic filler, and a nonionic surfactant. Therefore, pores can be uniformly formed between the domains that can be transformed into pores in the finally prepared porous super absorbent polymer or between the water soluble ethylene-based unsaturated monomers. Also, fine pores can be formed in the super absorbent polymer by the subsequent polymerization process. Further, due to the high shear force applied in the step of high-shear mixing, each component of the monomer neutralized solution can be uniformly mixed and the viscosity of the mixture can be maintained high.

In the step of high-shear mixing the monomer neutralized solution, conventionally known apparatuses and mixing methods may be used.

For example, examples of the apparatuses that can be used in the step of high-shear mixing include a beads mill, a microfludizers, a fil mixer, a planetary dispersive mixer, a mechanical mixer, or a homogenizer.

The step of high-shear mixing the monomer neutralized solution may include a step of mixing the monomer neutralized solution at a rate of 1,000 to 20,000 rpm.

The duration time of the step of high-shear mixing the monomer neutralized solution is not particularly limited, but can be carried out for 1 min to 100 min. If the duration time for carrying out the high-shear mixing is too short, the monomer neutralized solution may not be sufficiently mixed and pores which can form pores in the prepared porous super absorbent polymer may not be sufficiently formed.

If the duration time for carrying out the high-shear mixing is too long, the mixed solution may be dried or a polymerization phenomenon may occur, thereby deteriorating physical properties of the finally prepared porous super absorbent polymer.

Meanwhile, the nonionic surfactant enables the pores to be stably maintained in a uniformly distributed state throughout the monomer neutralized solution. In addition, it enables the formation of a large number of fine pores in the first cross-linked polymer in which the water soluble ethylene-based unsaturated monomer is cross-linked through the polymerization process. Further, the nonionic surfactant has an open-type micro pore structure to enable the formation of the capillary channel described above.

The nonionic surfactant may be used in an appropriate amount in consideration of the specific use or physical properties of the finally prepared porous super absorbent polymer. For example, the nonionic surfactant may be used in an amount of 0.1 to 5 parts by weight based on 100 parts by weight of the water soluble ethylene-based unsaturated monomer containing acidic groups.

As the nonionic surfactant, conventionally known nonionic surfactants may be used. Examples of the nonionic surfactant include alkylene glycol (for example, a C1 to C30 alkylene glycol), polyethylene glycol, poly(ethylene-propylene) glycol, polyvinyl alcohol, polyoxyethylene alkyl ether, sorbitan ester of fatty acid, fatty acid diethanolamine, alkyl monoglyceryl ether, and a mixture of two of more thereof. In addition, the nonionic surfactant may be a commercially available compound such as Triton X, Pluronic, Tween or the like.

After the high-shear mixing of the monomer neutralized solution, a hydrogel polymer may be prepared from the high-shear mixed monomer neutralized solution by thermal polymerization or photopolymerization.

The soluble ethylene-based unsaturated monomer may include at least one selected from the group consisting of anionic monomer such as acrylic acid, methacrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth) acrylamide-2-methyl propane sulfonic acid, and a salt thereof; a nonionic hydrophilic monomer such as (meth) acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; and an amino-containing unsaturated monomer such as (N,N)-dimethylaminoethyl(meth)acrylate or (N,N)-dimethylaminopropyl(meth)acrylamid, and a quaternary compound thereof.

Among these, acrylic acid or salts thereof, for example, acrylic acid and/or alkali metal salts thereof such as sodium salts in which at least a part of acrylic acid is neutralized, may be used. By using the monomer, it becomes possible to prepare a super absorbent polymer having superior physical properties. When the alkali metal salt of acrylic acid is used as the monomer, it is possible to use acrylic acid after neutralizing the same with a basic compound such as sodium hydroxide (NaOH).

In addition, as the internal cross-linking agent to introduce a basic cross-linked structure into the first cross-linked polymer and the base resin powder, any internal cross-linking agent having a cross-linkable functional group which has been generally used in the preparation of the super absorbent polymer may be used without limitation.

However, to further improve physical properties of the super absorbent polymer by introducing a proper cross-linked structure into the first cross-linked polymer and the base resin powder, a polyfunctional acrylate-based compound containing a plurality of ethylene oxide groups may be used as the internal cross-linking agent.

More specific examples of the internal cross-linking agent may include at least one selected from the group consisting of polyethylene glycol diacrylate (PEGDA), glycerine diacrylate, glycerine triacrylate, unmodified or ethoxylated trimethylol triacrylate (TMPTA), hexanediol diacrylate, and triethylene glycol diacrylate.

Specific examples of the inorganic filler usable in the monomer neutralized solution are not limited, but an inorganic particle chemically bonded to the first cross-linked polymer by a medium of a cross-linking bond, an oxygen-containing bond (—O—), or a nitrogen-containing bond (—NR—, where R is hydrogen or a C1-C3 alkyl or amide bond) is preferable.

Since the inorganic particle of which the surface is modified with a cross-linkable or hydrophilic functional group is used, the inorganic particle is chemically bonded (for example, a covalent bond, a cross-linking bond, and the like) to the polymer chains of the first cross-linked polymer by a medium of a cross-linking bond derived from the functional group (for example, a cross-linking bond derived from a (meth)acrylate-based functional group or a cross-linkable functional group of allyl group or vinyl group), or an oxygen- or nitrogen-containing bond (for example, an ether bond, an amine bond, or an amine bond derived from a hydrophilic functional group of an epoxy group, a hydroxy group, an isocyanate group, or an amine group).

By this, the first cross-linked polymer and the base resin powder have the double cross-linked structure that is formed by a medium of the internal cross-linking agent and the surface-modified inorganic particle, and thus the super absorbent polymer can exhibit excellent overall properties disclosed above (particularly, both the improved water retention capacity and absorption ability under pressure).

Also, a silica nanoparticle or an alumina nanoparticle that is surface-modified with the hydrophilic or cross-linkable functional group may be used as the inorganic particle.

The inorganic particle may be surface-modified with a cross-linkable or hydrophilic functional group including at least one functional group selected from the group consisting of a (meth)acrylate-based functional group, an allyl group, a vinyl group, an epoxy group, a hydroxy group, an isocyanate group, and an amine group, and specifically, the inorganic particle may be a silica nanoparticle or a alumina nanoparticle of which the surface is modified with a cross-linkable or hydrophilic functional group including at least one functional group selected from the group consisting of a (meth)acrylate-based functional group, an allyl group, a vinyl group, an epoxy group, a hydroxy group, an isocyanate group, and an amine group.

The cross-linkable or hydrophilic functional group may include at least one functional group selected from the group consisting of a (meth)acrylate-based functional group, an allyl group, a vinyl group, an epoxy group, a hydroxy group, an isocyanate group, and an amine group. Specifically, the cross-linkable or hydrophilic functional group may be a C2-C20 substituent including at least one functional group selected from the group consisting of a (meth)acrylate-based functional group, an allyl group, a vinyl group, an epoxy group, a hydroxy group, an isocyanate group, and an amine group at the end.

As described above, the inorganic particle can be chemically bonded to the first cross-linked polymer by a medium of a cross-linking bond, an oxygen-containing bond (—O—), or a nitrogen-containing bond, wherein the cross-linking bond, the oxygen-containing bond (—O—), or the nitrogen-containing bond may be formed through the reaction between the first cross-linked polymer and the inorganic particle of which the surface is modified with the cross-linkable or hydrophilic functional group.

The content of the inorganic filler may vary depending on the shape and characteristics of the finally prepared porous super absorbent polymer. For example, the inorganic filler may be used in an amount of 0.1 to 10 parts by weight based on 100 parts by weight of the water soluble ethylene-based unsaturated monomer in the monomer neutralized solution.

Meanwhile, the amount of the water soluble ethylene-based unsaturated monomer in the monomer neutralized solution may be about 20 to about 60 wt %, or about 40 to 50 wt %, and a proper concentration may be selected by considering polymerization time and reaction conditions. However, when the concentration of the monomer is excessively low, there may be a problem in economy because the yield of the super absorbent polymer becomes low, and contrarily, when the concentration is excessively high, there may be a problem in the process in that part of the monomer is extracted or the pulverizing efficiency becomes low in the pulverization process of the polymerized hydrogel polymer, and the properties of the super absorbent polymer may decrease.

In addition, the monomer neutralized solution may further include a thermal polymerization initiator or a photopolymerization initiator, and the monomer composition may further include a polymerization initiator that has been generally used for preparing a super absorbent polymer.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Here, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present invention is not limited thereto.

The concentration of the photopolymerization initiator in the monomer composition may be about 0.01 to about 1.0 wt %. When the concentration of the photopolymerization initiator is excessively low, the polymerization rate becomes slow, and when the concentration of the photopolymerization initiator is excessively high, the molecular weight of the super absorbent polymer becomes low and the properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate (K2S2O8), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present invention is not limited thereto.

The concentration of the thermal polymerization initiator included in the monomer composition may be about 0.001 to about 0.5 wt %. When the concentration of the thermal polymerization initiator is excessively low, additional thermal polymerization hardly occurs and there may be less effect according to the addition of the thermal polymerization initiator, and when the concentration of the thermal polymerization initiator is excessively high, the molecular weight of the super absorbent polymer becomes low and the properties may be uneven.

The kind of the internal cross-linking agent included together in the monomer composition is the same as above, and the internal cross-linking agent may be included in the monomer composition with the concentration of about 0.01 to about 0.5 wt % and cross-link the prepared polymer. Particularly, the super absorbent polymer satisfying the properties of one embodiment disclosed above can more properly be obtained by using about 0.3 parts by weight or more, or about 0.3 to 0.6 parts by weight, of the internal cross-linking agent, based on 100 parts by weight of the monomer, for example, non-neutralized acrylic acid.

Furthermore, the monomer composition may further include an additive such as a thickener, a plasticizer, a preservation stabilizer, an antioxidant, and the like, if necessary.

The raw materials such as the water soluble ethylene-based unsaturated monomer, the surface-modified inorganic particle, the photopolymerization initiator, the thermal polymerization initiator, the internal cross-linking agent, and the additive may be prepared in the form of a monomer composition solution dissolved in a solvent.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used solely or in combination.

The solvent may be included in the monomer composition at a residual quantity except for the above components.

Meanwhile, the method of preparing the hydrogel polymer by thermal polymerization or photopolymerization of the monomer composition is not particularly limited if it is a common polymerization method.

Specifically, the polymerization method is largely divided into the thermal polymerization and the photopolymerization according to the energy source of the polymerization. In the case of thermal polymerization, it is generally carried out in a reactor having a kneading spindle, such as a kneader. In the case of photopolymerization, it may be carried out in a reactor equipped with a movable conveyor belt. However, the polymerization method is just an example, and the present invention is not limited thereto.

For example, as described above, the hydrogel polymer obtained by carrying out the thermal polymerization by providing hot air to a reactor equipped with a kneading spindle such as a kneader or heating the reactor is discharged from the outlet of the reactor and may have a size of centimeters or millimeters, according to the shape of the kneading spindle installed in the reactor. Specifically, the size of the obtained hydrogel polymer may vary according to the concentration and the feeding rate of the monomer composition, and generally the obtained hydrogel polymer may have a weight average diameter of about 2 to about 50 mm.

Furthermore, in the case of carrying out the photopolymerization in a reactor equipped with a movable conveyor belt, the hydrogel polymer may be obtained in the form of a sheet having a width corresponding to a width of the belt. At this time, the thickness of the polymer sheet may vary according to the concentration and the feeding rate of the monomer composition, but it is preferable to feed the monomer composition so that a polymer sheet having a thickness of about 0.5 to about 5 cm can be obtained. It is undesirable to feed the monomer composition so that the thickness of the polymer sheet becomes excessively thin, because it makes the production efficiency low, and if the thickness of the obtained polymer sheet is over 5 cm, the polymerization reaction cannot evenly occur across the thickness because of its excessively thick thickness.

Generally, the moisture content of the hydrogel polymer obtained by the above method may be about 40 to about 80 wt %. At this time, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

Further, after the cross-linking polymerization of the monomer, the base resin powder may be obtained by the processes of drying, pulverization, classification, and the like. Here, it is preferable that the base resin powder and the super absorbent polymer obtained therefrom are prepared and provided so as to have a diameter of about 150 to 850 μm, through the processes of pulverization and classification. More specifically, at least about 95 wt % of the base resin powder and the super absorbent polymer obtained therefrom have a diameter of about 150 to 850 μm, and the fine powder having a diameter less than about 150 μm may be less than about 3 wt %.

Since the particle size distributions of the base resin powder and the super absorbent polymer are controlled in a preferable range, the finally prepared super absorbent polymer can exhibit the properties disclosed above as well as excellent permeability.

The processes of drying, pulverization, and classification will be described in more detail as follows.

First, in drying the hydrogel polymer, a coarse pulverizing step may be further included before the drying step for increasing the drying efficiency, if necessary.

Here, the pulverizing machine is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverizing step, the hydrogel polymer may be crushed to have a diameter of about 2 to about 10 mm.

It is technically difficult to pulverize the hydrogel polymer to have a diameter of less than 2 mm because of its high moisture content, and there may be a phenomenon that the crushed particles cohere with each other. Meanwhile, when the polymer is crushed to have a diameter of larger than 10 mm, the efficiency enhancing effect in the subsequent drying step may be low.

The hydrogel polymer coarsely pulverized as above or the hydrogel polymer immediately after the polymerization without the coarse pulverizing step is subjected to drying. At this time, the drying temperature of the drying step may be about 150 to about 250° C. When the drying temperature is lower than about 150° C., the drying time may become excessively long and the properties of the super absorbent polymer finally prepared may decrease. And when the drying temperature is higher than about 250° C., the surface of the polymer is excessively dried, and fine powders may be generated in the subsequent pulverization process and the properties of the super absorbent polymer finally prepared may decrease. Therefore, the drying process may be preferably carried out at a temperature of about 150 to about 200° C., more preferably at a temperature of about 160 to about 180° C.

Meanwhile, the drying time may be about 20 to about 90 min in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %.

Subsequently, the step of pulverizing the dried polymer obtained from the drying step is carried out.

The polymer powder obtained after the pulverization step may have a diameter of about 150 to about 850 μm. In order to pulverize the polymer into such diameter, a pin mill, a hammer mill, a screw mill, a roll mill, a disc mill, or a jog mill may be used as the pulverizer, but it is not limited thereto.

Further, in order to maintain the properties of the super absorbent polymer powder which is finally commercialized after the pulverization step, a separate process of classifying the polymer powders obtained after the pulverization according to the particle size may be carried out. Preferably, after classifying the polymer having a diameter of about 150 to about 850 μm, only the polymer powder may be subjected to the surface cross-linking reaction and finally commercialized. Since details regarding the particle size distribution of the base resin powder obtained by this process are already explained above, more detailed explanation thereof will be omitted here.

On the other hand, the preparation method of a porous super absorbent polymer may further include a step of further cross-linking the surface of the base resin powder in the presence of a surface cross-linking agent to form a surface cross-linked layer. That is, after preparing the base resin powder, the surface cross-linked layer may be formed by further cross-linking the surface of the base resin powder in the presence of the surface cross-linking agent.

Any surface cross-linking agent that has been used for preparing a super absorbent polymer can be used as the surface cross-linking agent for forming the surface cross-linked layer formed on the base resin powder and the second cross-linked polymer included therein, without limitation.

For more specific examples, at least one selected from the group consisting of ethylene glycol, 1,4-butanediol, 1,6-hexanediol, propylene glycol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate and propylene carbonate may be used.

In the surface cross-linking process, the surface cross-linked structure of the super absorbent polymer may be more optimized by carrying out the surface cross-linking after adding a multivalent metal cation in company with the surface cross-linking agent. This may be because the metal cation forms a chelate with a carboxyl group (COOH) of the super absorbent polymer, and further reduces the cross-linking distance.

In addition, the method of adding the surface cross-linking agent to the base resin powder is not particularly limited. For example, a method of adding and mixing the surface cross-linking agent and the base resin powder in a reactor, a method of spraying the surface cross-linking agent on the base resin powder, and a method of mixing the base resin powder and the surface cross-linking agent while continuously providing them to a continuously operating mixer may be used.

When the surface cross-linking agent is added thereto, water and methanol may be further mixed therewith. When water and methanol are added thereto, there is an advantage that the surface cross-linking agent can be evenly dispersed in the base resin powder. At this time, the amount of water and methanol per 100 parts by weight of the base resin powder may be controlled for the purposes of inducing a uniform dispersion of the surface cross-linking agent, preventing an agglomeration phenomenon, and optimizing the surface penetration depth of the cross-linking agent.

The surface cross-linking reaction may be carried out by heating the base resin powder to which the surface cross-linking agent is applied at about 160° C. or more for 20 min. Particularly, in order to obtain the super absorbent polymer satisfying the properties according to one embodiment properly, the surface cross-linking process may be carried out under the condition that the maximum reaction temperature is about 180 to 200° C. and the maximum reaction temperature is maintained for about 20 min or more, or for about 20 min to 1 hour. Furthermore, the heat-up time from the initiation temperature, for example, about 160° C. or more, or about 160 to 170° C., to the maximum reaction temperature may be controlled to be about 10 min or more, or about 10 min to 1 hour. And it is recognized that the super absorbent polymer satisfying the properties according to one embodiment properly can be prepared by satisfying the above surface cross-linking process condition.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

The super absorbent polymer obtained by the above preparation method can show excellent properties in which various properties such as water retention capacity and absorption ability under pressure are improved together, and it can be adequately applied to various sanitary products such as a diaper and can show excellent overall properties.

And, the super absorbent polymer may have the centrifuge retention capacity (CRC) to a saline solution of about 20 to 40 g/g, and the absorption ability under pressure (AUP) at 0.7 psi to a saline solution of about 15 to 35 g/g.

Meanwhile, the centrifuge retention capacity (CRC) to a saline solution may be measured according to EDANA method WSP 241.2. More specifically, the centrifuge retention capacity can be calculated by the following Calculation Equation 1, after making the super absorbent polymer absorb the saline solution for 30 min:

$$CRC(g/g) = \{[W_2(g) - W_1(g)]/W_0(g)\} - 1 \quad \text{[Calculation Equation 1]}$$

In Calculation Equation 1, $W_0(g)$ is an initial weight (g) of the super absorbent polymer, $W_1(g)$ is a weight of the apparatus measured after dehydrating the same by using a centrifuge at 250 G for 3 min without using the super absorbent polymer, and $W_2(g)$ is a weight of the apparatus with the superabsorbent polymer measured after soaking the super absorbent polymer in a 0.9 wt % saline solution for 30 min at room temperature and dehydrating the same by using a centrifuge at 250 G for 3 min.

Furthermore, the absorption ability under pressure (AUP) at 0.7 psi may be measured according to EDANA method WSP 242.2. More specifically, the absorption ability under pressure can be calculated by the following Calculation Equation 2, after making the super absorbent polymer absorb the saline solution for 1 h under the pressure of about 0.7 psi:

$$AUP(g/g) = [W_4(g) - W_3(g)]/W_0(g) \quad \text{[Calculation Equation 2]}$$

In Calculation Equation 2, $W_0(g)$ is an initial weight (g) of the super absorbent polymer, $W_3(g)$ is a sum of a weight of the super absorbent polymer and a weight of the apparatus providing load to the polymer, and $W_4(g)$ is a sum of a weight of the super absorbent polymer and a weight of the apparatus providing load to the polymer measured after making the super absorbent polymer absorb the saline solution for 1 h under the pressure (0.7 psi).

$W_0(g)$ in Calculation Equations 1 and 2 corresponds to the initial weight of the super absorbent polymer before the super absorbent polymer absorbs the saline solution, and it may be the same or different in each equations.

Further, the horizontal direction gel strength G' may be measured according to the following method disclosed in Korea Patent Application No. 2014-01653514.

More specifically, after making the super absorbent polymer absorb the saline solution for 1 h, the horizontal direction gel strength G' may be measured according to the method including the following steps, by using a commercial rheometer:

1) The step of making the super absorbent polymer absorb the saline solution and swell; 2) the step of positioning the swelled super absorbent polymer between the plates of the rheometer having a certain gap, and pressing both sides of the plates; 3) the step of checking the shear strain in the linear viscoelastic regime section where the storage modulus and the loss modulus are constant, while increasing the shear strain by using the rheometer under vibration; and 4) the step of measuring the storage modulus and the loss modulus of the swelled super absorbent polymer under the checked shear strain, and determining the average value of the storage modulus as the gel strength.

More specific measuring conditions and method of the horizontal direction gel strength G' are disclosed in Examples below.

In addition, in the super absorbent polymer of one embodiment, the permeability (SFC) to the saline solution under the pressure of about 0.3 psi may be about 10×10-7 cm3*sec/g or more. The permeability may be measured according to a method using Darcy's law and a constant flow method (for example, "Absorbency", edited by P. K. Chatterjee, Elsevier 1985, pp. 42-43 and Chemical Engineering, Vol. II, 3rd edition, J. M. Coulson and J. F. Richarson, Pergamon Press, 1978, pp. 125-127).

And, the super absorbent polymer of one embodiment may have a particle shape of spherical or amorphous having a diameter of about 150 to 850 μm.

Advantageous Effects

According to the present disclosure, a preparation method capable of providing a porous super absorbent polymer which can swell at a high rate upon contact with water and has mechanical properties such as high gel strength in a swollen state while exhibiting excellent physical properties such that water retention capacity (CRC) and absorption ability under pressure (AUP) are improved together, can be provided.

The super absorbent polymer of the present disclosure basically resolves the problems of existing super absorbent polymers and the technical requirements of the related art, and can show more improved properties, thereby suitably applied to various sanitary products.

DETAILED DESCRIPTION OF THE EMBODIMENTS

Hereinafter, the present invention will be described in more detail with reference to examples. However, these examples are for illustrative purposes only, and the invention is not intended to be limited by these examples.

EXAMPLE 1

35.83 g of acrylic acid, 56.54 g of sodium hydroxide (NaOH, 30 wt % solution), and 7.76 g of water were mixed to prepare a neutralized solution (the neutralization degree of acrylic acid: about 90 mol %).

1,000 ppm of polyethylene glycol diacrylate (Mw=400) as an internal cross-linking agent, 1.07 g of Pluronic® P123 [poly(ethylene oxide)(propylene oxide)(ethylene oxide) 3 block copolymer] and 0.71 g of silica particles surface-modified with a hydroxy group (30 wt % in the aqueous solution, Colloidal Silica having a particle diameter of 12 nm with a specific surface area of 200 m$^2$/g) were added to the neutralized solution to prepare a monomer aqueous solution having a monomer concentration of 50 wt %.

The monomer aqueous solution was subjected to high-shear mixing at 5,000 rpm for about 60 min using a mechanical mixer.

Thereafter, 810 g of the high-shear mixed monomer neutralized solution was firstly mixed with 30.54 g of a 0.18% ascorbic acid solution and 33 g of a 1% sodium persulfate solution, and then continuously polymerized with 30.45 g of a 0.15% hydrogen peroxide solution while being fed through a feeding part of the polymerization reactor capable of kneading. At this time, the temperature of the polymerization reactor was maintained at 80° C., the maximum temperature of the polymerization was 110° C., and the polymerization time was 1 min and 15 sec. Thereafter, the polymerization and kneading were carried out for 20 minutes by continuing the kneading. The size of the prepared polymer was distributed below 0.2 cm. Here, the moisture content of the finally prepared hydrogel polymer was 51 wt %.

Subsequently, the hydrogel polymer was dried with a hot air drier at 180° C. for 30 min, and the dried hydrogel polymer was pulverized with a pin mill pulverizer. And then, the polymer having a diameter less than about 150 μm and the polymer having a diameter of about 150 μm to 850 μm were classified by using a sieve.

Thereafter, a surface treatment solution containing 5 wt % of 1,3-propanediol and 5 wt % of propylene glycol was sprayed onto the prepared base resin powder, and stirred at room temperature so that the surface treatment solution was evenly distributed on the base resin powder.

Thereafter, a porous super absorbent polymer having a diameter of about 150 to 850 μm was obtained by using a sieve. In the product of the porous super absorbent polymer, the content of the fine powder having a diameter of about 150 μm or less was less than about 2 wt %.

EXAMPLE 2

A porous super absorbent polymer of Example 2 was prepared in the same manner as in Example 1 except that Pluronic® F127 [poly(ethylene oxide)(propylene oxide)(ethylene oxide) 3 block copolymer] was used instead of Pluronic® P123 [poly(ethylene oxide)(propylene oxide)(ethylene oxide) 3 block copolymer].

COMPARATIVE EXAMPLE 1

35.83 g of acrylic acid, 43.54 g of sodium hydroxide (NaOH, 30 wt % solution), and 7.76 g of water were mixed to prepare a neutralized solution (the neutralization degree of acrylic acid: 70 mol %).

1,000 ppm of polyethylene glycol diacrylate (Mw=400) as an internal cross-linking agent, and 0.71 g of silica particles surface-modified with a hydroxy group (30 wt % in the aqueous solution, Colloidal Silica having a particle diameter of 12 nm with a specific surface area of 200 m$^2$/g) were added to the neutralized solution to prepare a monomer aqueous solution having a monomer concentration of 50 wt %.

The monomer aqueous solution was subjected to high-shear mixing at 5,000 rpm for about 60 min using a mechanical mixer.

Thereafter, 810 g of the high-shear mixed monomer neutralized solution was firstly mixed with 30.54 g of a 0.18% ascorbic acid solution and 33 g of a 1% sodium persulfate solution, and then continuously polymerized with 30.45 g of a 0.15% hydrogen peroxide solution while being fed through a feeding part of the polymerization reactor capable of kneading. At this time, the temperature of the polymerization reactor was maintained at 80° C., the maximum temperature of the polymerization was 110° C., and the polymerization time was 1 min and 15 sec. Thereafter, the polymerization and kneading were carried out for 20 minutes by continuing the kneading. The size of the prepared polymer was distributed below 0.2 cm. Here, the moisture content of the finally prepared hydrogel polymer was 51 wt %.

Subsequently, the hydrogel polymer was dried with a hot air drier at 180° C. for 30 min, and the dried hydrogel polymer was pulverized with a pin mill pulverizer. And then, the polymer having a diameter less than about 150 μm and the polymer having a diameter of about 150 μm to 850 μm were classified by using a sieve.

Thereafter, a surface treatment solution containing 5 wt % of 1,3-propanediol and 5 wt % of propylene glycol was sprayed onto the prepared base resin powder, and stirred at room temperature so that the surface treatment solution was evenly distributed on the base resin powder.

Thereafter, a super absorbent polymer having a diameter of about 150 to 850 μm was obtained by using a sieve. In the product of the porous super absorbent polymer, the content of the fine powder having a diameter of about 150 μm or less was less than about 2 wt %.

COMPARATIVE EXAMPLE 2

A super absorbent polymer was prepared in the same manner as in Example 1 except that a neutralized solution (the neutralization degree of acrylic acid: about 70 mol %) was prepared by mixing 35.83 g of acrylic acid, 43.54 g of sodium hydroxide (NaOH, 30 wt % solution), and 7.76 g of water.

EXPERIMENTAL EXAMPLES

The properties of the super absorbent polymers of Examples and Comparative Examples were evaluated according to the following methods, and the measured property values are shown in the following Table 1.

(1) Centrifuge Retention Capacity (CRC)

For the super absorbent polymers of Examples and Comparative Examples, the centrifuge retention capacity (CRC) by absorption ratio under a non-loading condition was measured according to the EDANA (European Disposables and Nonwovens Association) method WSP 241.2.

That is, after inserting $W_0$ (g, about 0.2 g) of each polymer obtained in Examples and Comparative Examples uniformly in a nonwoven fabric envelope and sealing the same, it was soaked in a 0.9 wt % saline solution at room temperature. After 30 min, it was dehydrated by using a centrifuge at 250 G for 3 min, and the weight $W_2$ (g) of each envelope was measured. Further, after carrying out the same operation without using the polymer, the weight $W_1$ (g) of each envelope was measured.

CRC (g/g) was calculated by using the obtained weight values according to the following Calculation Equation 1, and the water retention capacity was confirmed.

$$CRC(g/g) = \{[W_2(g) - W_1(g)]/W_0(g)\} - 1 \quad \text{[Calculation Equation 1]}$$

In Calculation Equation 1, $W_0(g)$ is an initial weight (g) of the super absorbent polymer, $W_1(g)$ is a weight of the apparatus measured after dehydrating the same by using a centrifuge at 250 G for 3 min without using the super absorbent polymer, and $W_2(g)$ is a weight of the apparatus with the superabsorbent polymer measured after soaking the super absorbent polymer in a 0.9 wt % saline solution for 30 min at room temperature and dehydrating the same by using a centrifuge at 250 G for 3 min.

(2) Absorption Rate of Super Absorbent Polymer 2.0 g of a sample having a diameter of 300 μm to 500 μm of the super absorbent polymer prepared in each of the above Examples and Comparative Examples was separated and placed in a 100 mL flask. And then, 50 mL of 0.9 wt % aqueous solution of sodium chloride was added thereto, and allowed to swell freely while stirring at 600 rpm. Then, the time was measured until the vortex of the liquid generated by the stirring disappeared and a smooth surface was formed.

The properties of the super absorbent polymers of Examples and Comparative Examples measured by the above methods are listed in Table 2.

TABLE 1

|  | Comp. Ex. 1 | Comp. Ex. 2 | Example 1 | Example 2 |
|---|---|---|---|---|
| Internal cross-linking agent (ppmw) | 1600 | 1600 | 1600 | 1600 |
| Nonionic surfactant |  | P123/3 wt % | P123/3 wt % | F127/3 wt % |
| Inorganic filler (wt % based on acrylic acid) | Silica (2) | Silica (2) | Silica (2) | Silica (2) |
| Centrifuge Retention Capacity (CRC) [unit: g/g] | 48.3 | 29.6 | 28.8 | 32.4 |
| The neutralization degree (%) | 69.8 | 71.4 | 91.3 | 89.9 |
| Absorption rate (sec) | 90 | 52 | 48 | 49 |

Figure 1:
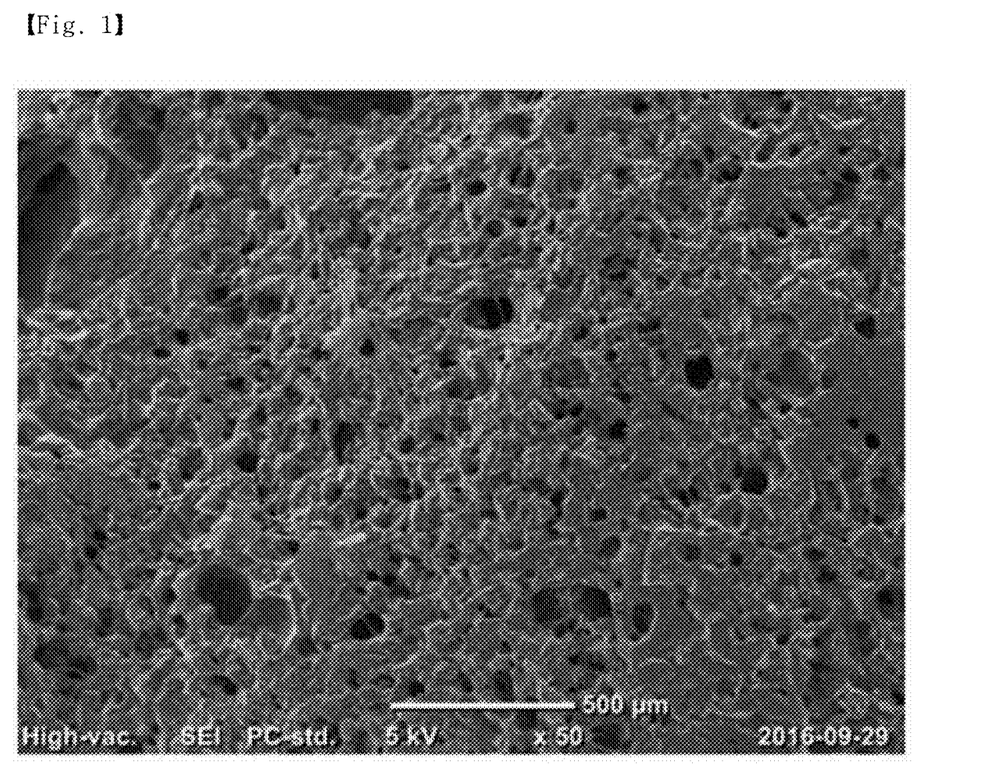
FIG. 1 is a SEM image of the porous super absorbent polymer of Example 1.
Figure 2:
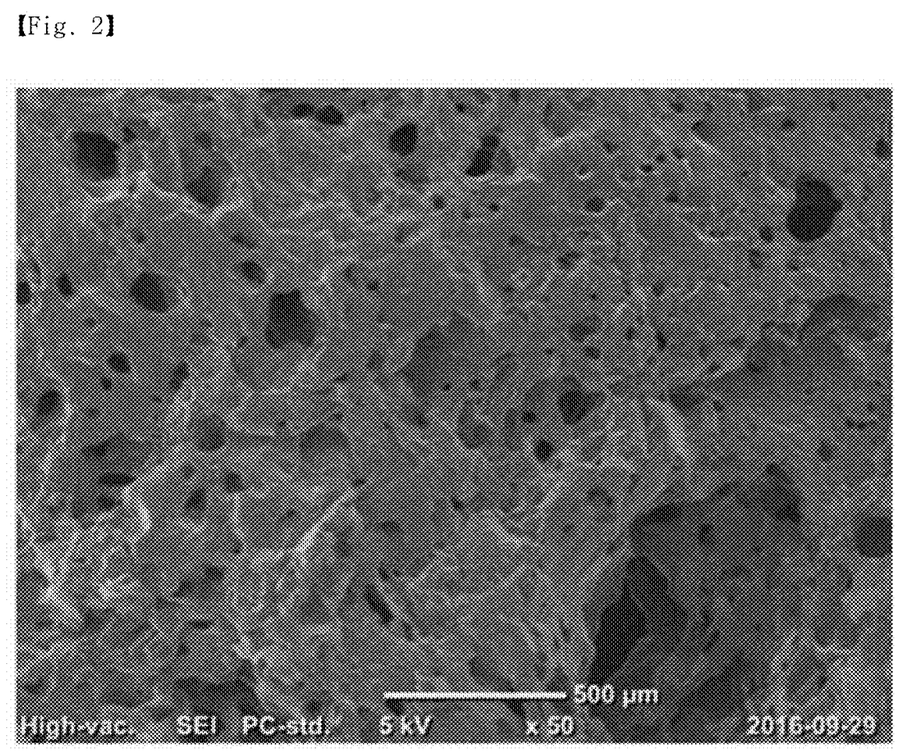
FIG. 2 is a SEM image of the porous super absorbent polymer of Example 2.

As shown in FIGS. 1 and 2, Examples 1 and 2 can provide a porous super absorbent polymer in which fine pores are uniformly distributed, since the polymer is prepared from the monomer neutralized solution formed by neutralizing 80 mol % or more of the water soluble ethylene-based unsaturated monomer containing acidic groups and adding the nonionic surfactant.

In addition, as shown in Table 1, the porous super absorbent polymers prepared in Examples 1 and 2 are excellent in physical properties such as water retention capacity and absorption ability, and can swell at a high rate upon contact with water. This is because the fine pores formed uniformly in the porous super absorbent polymers of Examples 1 and 2 are connected to each other to form a capillary channel, thereby rapidly absorbing water present on the outside and swelling in a short time. Also, the pores existing in the porous super absorbent polymers of Examples 1 and 2 greatly increase the specific surface area on which water can be diffused, thereby significantly increasing the swelling rate.

Figure 3:
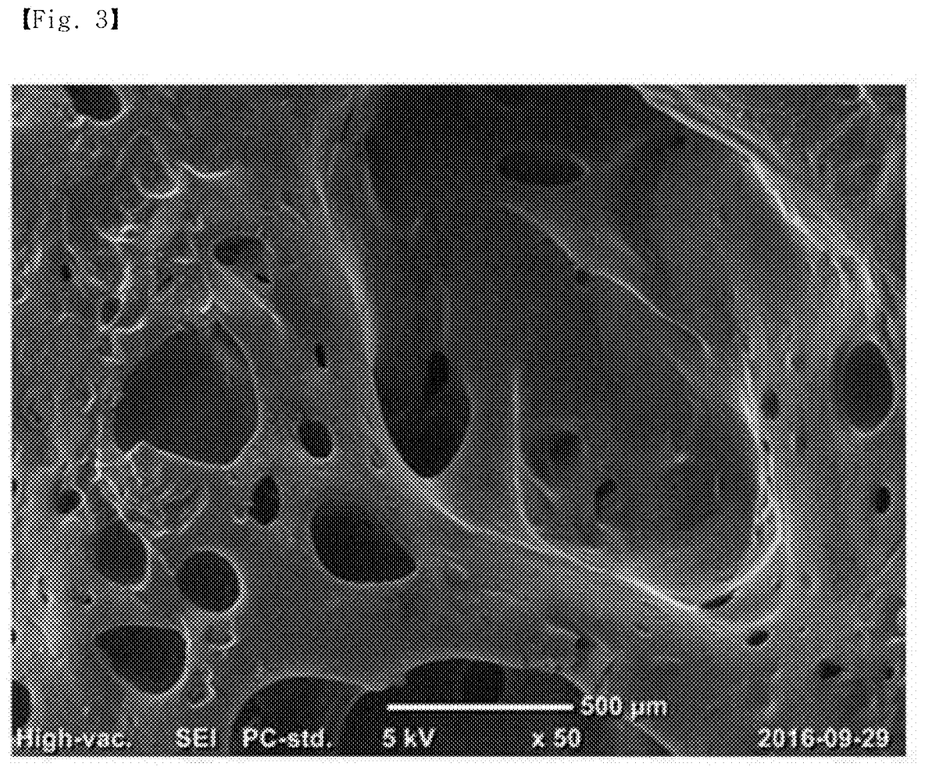
FIG. 3 is a SEM image of the porous super absorbent polymer of Comparative Example 2.

On the contrary, as shown in FIG. 3, it was confirmed that the pores having a non-uniform size were formed in the super absorbent polymer of Comparative Example 2. As shown in Table 1, it was also confirmed that the super absorbent polymers of Comparative Examples 1 and 2 have a relatively low swelling rate in water.

The invention claimed is:

1. A preparation method of a porous super absorbent polymer, comprising the steps of:
   preparing a monomer neutralized solution by adding an internal cross-linking agent, an initiator, an inorganic filler, and a nonionic surfactant to a neutralized solution obtained by neutralizing at least 80 mol % of a water soluble ethylene-based unsaturated monomer containing acidic groups;
   high-shear mixing the monomer neutralized solution;
   preparing a hydrogel polymer from the high-shear mixed monomer neutralized solution by thermal polymerization or photopolymerization; and
   preparing a base resin powder by drying, pulverizing, and classifying the hydrogel polymer.

2. The preparation method of a porous super absorbent polymer of claim 1,
   wherein the nonionic surfactant is used in an amount of 0.1 to 5 parts by weight based on 100 parts by weight of the water soluble ethylene-based unsaturated monomer containing acidic groups.

3. The preparation method of a porous super absorbent polymer of claim 1,
wherein the nonionic surfactant comprises at least one selected from the group consisting of alkylene glycol, polyethylene glycol, poly(ethylene-propylene) glycol, polyvinyl alcohol, polyoxyethylene alkyl ether, sorbitan ester of fatty acid, fatty acid diethanolamine and alkyl monoglyceryl ether.

4. The preparation method of a porous super absorbent polymer of claim 1,
wherein the step of high-shear mixing the monomer neutralized solution comprises a step of mixing the monomer neutralized solution at a rate of 1,000 to 20,000 rpm.

5. The preparation method of a porous super absorbent polymer of claim 1,
wherein the step of high-shear mixing the monomer neutralized solution is carried out for 1 min to 100 min.

6. The preparation method of a porous super absorbent polymer of claim 1,
further comprising a step of adding a basic compound to the water soluble ethylene-based unsaturated monomer containing acidic groups to form a neutralized solution which is at least 80 mol % neutralized.

7. The preparation method of a porous super absorbent polymer of claim 1,
wherein the water soluble ethylene-based unsaturated monomer comprises at least one selected from the group consisting of: an anionic monomer of acrylic acid, methacrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof;
a nonionic hydrophilic monomer of (meth)acrylamide, N-substituted (meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and
an amino-containing unsaturated monomer of (N,N)-dimethylaminoethyl(meth)acrylate or (N,N)-dimethylaminopropyl(meth)acrylamid, and a quaternary compound thereof.

8. The preparation method of a porous super absorbent polymer of claim 1,
wherein the internal cross-linking agent comprises at least one selected from the group consisting of polyethylene glycol diacrylate (PEGDA), glycerine diacrylate, glycerine triacrylate, unmodified or ethoxylated trimethylol triacrylate (TMPTA), hexanediol diacrylate, and triethylene glycol diacrylate.

9. The preparation method of a porous super absorbent polymer of claim 1,
wherein the inorganic particle is a silica nanoparticle or an alumina nanoparticle surface-modified with a cross-linkable or hydrophilic functional group containing at least one functional group selected from the group consisting of a (meth)acrylate-based functional group, an allyl group, a vinyl group, an epoxy group, a hydroxyl group, an isocyanate group and an amine group.

10. The preparation method of a porous super absorbent polymer of claim 1,
further comprising a step of further cross-linking the surface of the base resin powder in the presence of a surface cross-linking agent to form a surface cross-linked layer.

11. The preparation method of a porous super absorbent polymer of claim 10,
wherein the surface cross-linking agent comprises at least one selected from the group consisting of ethylene glycol, 1,4-butanediol, 1,6-hexanediol, propylene glycol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, glycerol, ethylene carbonate and propylene carbonate.

12. The preparation method of a porous super absorbent polymer of claim 1,
wherein the water soluble ethylene-based unsaturated compound is included in an amount of 20 to 60 wt % in the monomer neutralized solution.

* * * * *